United States Patent [19]

Sirkoch et al.

[11] Patent Number: 4,634,602
[45] Date of Patent: Jan. 6, 1987

[54] PRIMER COMPOSITION

[75] Inventors: Robert J. Sirkoch, Pittsburgh; Kenneth W. Niederst, Allison Park, both of Pa.

[73] Assignee: PPG Industries, Inc., Pittsburgh, Pa.

[21] Appl. No.: 815,698

[22] Filed: Jan. 2, 1986

[51] Int. Cl.$^4$ ............................. B05D 3/06; C08F 8/00
[52] U.S. Cl. .................................... 427/44; 427/54.1; 522/6; 522/94
[58] Field of Search ............. 427/44, 54.1, 386, 407.1, 427/410; 522/94, 6

[56] References Cited

U.S. PATENT DOCUMENTS

| | | | |
|---|---|---|---|
| 3,876,432 | 4/1975 | Carlick et al. | 522/94 X |
| 3,899,611 | 8/1975 | Hall | 427/54.1 |
| 4,025,407 | 5/1977 | Chang et al. | 204/159.14 |
| 4,128,600 | 12/1978 | Skinner et al. | 204/159.16 X |
| 4,169,732 | 10/1979 | Shipley | 427/54.1 X |
| 4,205,018 | 5/1980 | Nagasawa et al. | 525/404 |
| 4,295,947 | 10/1981 | Ohtani et al. | 204/159.15 |
| 4,342,793 | 7/1982 | Skinner et al. | 427/44 |
| 4,374,963 | 2/1983 | Morgan et al. | 525/486 |
| 4,391,855 | 7/1983 | Geeck | 427/383.7 |
| 4,425,207 | 1/1984 | Boeckeler et al. | 204/159.14 |

Primary Examiner—Thurman K. Page
Attorney, Agent, or Firm—Barbara J. Park

[57] ABSTRACT

Compositions of the invention comprise a radiation sensitive compound having ethylenic unsaturation and at least one moiety selected from the group consisting of a urea moiety, a urethane moiety and mixtures thereof, a radiation insensitive compound having a number average molecular weight of at least about 400 comprising at least about 40 percent, by weight, based on the weight of the radiation insensitive compound, of aromatic ring moieties and having a hydroxyl equivalent weight of between about 200 and 1500 and a crosslinking agent reactive with the hydroxyl groups present in said radiation insensitive compound, said crosslinking agent being selected from the group consisting of an aminoplast resin, a blocked isocyanate and mixtures thereof. The composition is capable of being cured using heat and either ultraviolet light or ionizing radiation. A process for applying and curing the composition of the invention on a substrate is also disclosed.

17 Claims, No Drawings

PRIMER COMPOSITION

BACKGROUND OF THE INVENTION

The invention relates to dual cure resin compositions and, more particularly, such resin compositions with utility as primers for coil coatings.

Primers for coil coating must have a number of properties including corrosion protection for the metal substrate, flexibility so that the finished product can be rolled, good adhesion to both the metal substrate and the coating applied over the primer as well as application and cure properties so that the primer can be applied to a substrate and cured while the substrate is moving at a line speed of 300–400 feet per minute.

One conventional primer is an epoxy-urea formaldehyde based primer, which is typically applied and thermally cured to a 0.2–0.3 mils dry film thickness. A durable topcoat is then applied thereto and thermally cured. This type of conventional primer is limited to such a low dry film thickness because the composition is only approximately 60 percent, by weight, solids and, therefore, at the high line and curing speeds required for application, the coating blisters at high film builds due to solvent popping.

It is desired, therefore, to develop a composition that can be applied at higher film thicknesses than conventional primers in order to achieve better corrosion protection for the substrate.

Further, such conventional primer-topcoat systems require two baking steps, which involve a tremendous amount of energy. Thus, it is further desired to develop a coating system for protecting metal substrates that reduces the energy necessary to cure the coatings.

SUMMARY OF THE INVENTION

Compositions of the invention comprise a radiation sensitive compound having ethylenic unsaturation and at least one moiety selected from the group consisting of a urea moiety, a urethane moiety and mixtures thereof, a radiation insensitive compound having a number average molecular weight of at least about 400 comprising at least about 40 percent, by weight, based on the weight of the radiation insensitive compound, of aromatic ring moieties and having a hydroxyl equivalent weight of between about 200 and 1500 and a crosslinking agent reactive with the hydroxyl groups present in the radiation insensitive compound. The crosslinking agent is selected from the group consisting of an aminoplast resin, a blocked isocyanate and mixtures thereof. The composition is capable of being cured using heat and either ultraviolet light or ionizing radiation. Preferably, the compositions of the invention further include an ethylenically unsaturated monomer which acts as a reactive diluent.

The term "radiation sensitive compound" is used herein to refer to those compounds which crosslink upon exposure to either ionizing radiation or ultraviolet light. The term "radiation insensitive compound" is used herein to refer to those compounds which are not radiation sensitive and crosslink upon exposure to heat. The radiation sensitive and radiation insensitive compounds do not interreact during exposure to ionizing radiation or ultraviolet light, but can interreact upon exposure to heat.

Processes of the invention comprise the steps of applying to a metal substrate a composition of the invention to form a coated substrate partially curing the composition in a first curing step and further curing the composition in a second curing step. One of the curing steps involves exposing the coated substrate to either ultraviolet light or ionizing radiation. The other curing step involves exposing the coated substrate to heat.

The composition of the invention is particularly useful as a primer for coil coatings.

Because the primer is only partially cured prior to the application of the topcoat thereto, the system has good intercoat adhesion. The primer has good adhesion to the metal substrate because, particularly in the preferred embodiment, after the primer is partially cured, heating during the second curing step results in improved wetting and reflow. In addition, the presence of the thermally curable portion of the primer aids in the adhesion of the primer to the metal substrate.

Further, the primer-topcoat coating system requires less energy than the conventional primer-topcoat systems because the primer is initially partially cured and there is only one thermal curing step.

DETAILED DESCRIPTION OF THE PREFERRED EMBODIMENTS

Compositions of the invention include a radiation sensitive compound having ethylenic unsaturation and at least one moiety selected from the group consisting of urea moieties, urethane moieties and mixtures thereof. The radiation sensitive compound containing ethylenic unsaturation and at least one moiety selected from the group consisting of urethane moieties, urea moieties and mixtures thereof preferably contains two ethylenically unsaturated groups. The preferred form of ethylenic unsaturation is acrylate functionality. Further, the radiation sensitive compound preferably contains a urethane moiety and is preferably a urethane acrylate. More preferably, the radiation sensitive compound is a urethane diacrylate. The preferred urethane acrylates are typically prepared by reacting an isocyanate-functional urethane with a hydroxyl-functional acrylate. The radiation sensitive compound is preferably present in the compositions of the invention at a level of from about 5 percent to about 50 percent, by weight, more preferably, from about 15 to about 30 percent, by weight, based on resin solids.

Useful isocyanate-functional polyurethanes are generally known and can be produced by reacting polyols, including diols, triols, and higher hydric alcohols, polyether polyols and polyester polyols with an excess of an organic polyisocyanate. The organic polyisocyanate is typically reacted with the polyol directly to form the isocyanate-functional polyurethane.

The simple diols, triols, and higher hydric alcohols useful in the preparation of the isocyanate-functional polyurethanes are generally known, examples of which include 1,3-propanediol, 1,2-butanediol, 1,3-butanediol, 1,4-butanediol, 2,3-butanediol, 2,2,4-trimethyl-1,3-pentanediol, 1,5-pentanediol, 2,4-pentanediol, 1,6-hexanediol, 2,5-hexanediol, 1,7-heptanediol, 2,4-heptanediol, 1,8-octanediol, 1,9-nonanediol, 4,5-nonanediol, 1,10-decanediol, 1,9-decanediol, 2-methyl-1,3-pentanediol, 2-methyl-2,4-pentanediol, 2-ethyl-1,3-hexanediol, 2,2-dimethyl-1,3-propanediol, 2-ethylbutane-1,4-diol, 2,2-diethylpropane-1,3-diol, 2,2-dimethylpropane-1,3-diol, 3-methyl-pentane-1,4-diol, 2,2-diethylbutane-1,3-diol, 1,1,1-trimethylolpropane, trimethylolethane, 1,4-cyclohexanediol, 1,4-cyclohexanedimethanol, 1,2-bis(hydroxymethyl) cyclohexane, 1,2-bis(- hydroxyethyl) cyclohexane, ethylene glycol, diethylene glycol, triethylene glycol, propylene glycol, dipropylene glycol, neopentyl glycol, glycerol, pentaerythritol, erythritol, sorbitol, mannitol, and the like. Ethylenically unsaturated polyhydric alcohols such as 2-butene-1,4-diol may be used alone or in admixture with the saturated polyhydric alcohols. Of course, mixtures of saturated polyhydric alcohols or mixtures of unsaturated polyhydric alcohols may be employed.

In addition to the aforementioned polyhydric alcohols, suitable polyesters may also be formed from reaction of dicarboxylic acids with thioether diols such as thiodiethanol or a thioether diol made from reaction of 4,4'-dihydroxydiphenyl sulphite with propylene oxide.

Polyester polyols useful in the preparation of the isocyanate-functional polyurethanes are generally known and are prepared by conventional techniques utilizing simple diols, triols and higher hydric alcohols known in the art including, but not limited, to the previously described simple diols, triols, and higher hydric alcohols with polycarboxylic acids. Examples of suitable polycarboxylic acids include: phthalic acid, isophthalic acid, terephthalic acid, trimellitic acid, tetrahydrophthalic acid, 1,2-, 1,3- and 1,4-hexahydrophthalic acids, tetrachlorophthalic acid, adipic acid, pimelic acid, suberic acid, azelaic acid, sebacic acid, oxalic acid, malonic acid, succinic acid, methyl succinic acid, 2,2- and 2,3-dimethylsuccinic acids, hexyl succinic acid, glutaric acid, 2-methylglutaric acid, 3-methylglutaric acid, 3,3-dimethylglutaric acid, 2,2-dimethylglutaric acid, 3,3-diethylglutaric acid, 1,1-cyclobutanedicarboxylic acid, trans-1,4-cyclohexanedicarboxylic acid, maleic acid, fumaric acid, itaconic acid, aconitic acid, citraconic acid, mesaconic acid, muconic acid and dihydromuconic acid and halo and alkyl derivatives of such acids. Mixtures of ethylenically unsaturated polycarboxylic acids may be used or only a single such acid may be employed.

Anhydrides of the above acids, where they exist, can also be employed and are encompassed by the term "polycarboxylic acid."

One or more saturated polycarboxylic acids may optionally be utilized in combination with the ethylenically unsaturated acid or anhydride in the preparation of unsaturated polyesters. Such acids, especially the saturated dicarboxylic acids, increase the length of the polyester without adding additional crosslinking sites, which is a desired feature in some polyesters. Saturated tricarboxylic acids and saturated acids of higher carboxylic functionality may be used to provide branching where this is desirable.

The polyesters derived from reaction of the aforementioned polycarboxylic acids and polyhydric alcohols should have reactive hydroxyl functionality in sterically unhindered positions on the polyester backbone. Often, such hydroxyl functionality is located in terminal positions. This may be achieved by reacting a molar excess of the alcohol with a carboxyl-terminated acid; or the hydroxyl functionality may be introduced by capping the polyester with a di- or higher polyfunctional alcohol which is usually chosen from the aforementioned group of polyhydric alcohols. Other capping compounds for carboxyl-terminated polyesters include epoxides, such as ethylene oxide, propylene oxide and butylglycidylether, epihalohydrins such as epichlorohydrin and epibromohydrin, and the triglycerides of epoxidized fatty oils such as epoxidized linseed oil, safflower oil and soybean oil.

Preferred polyester polyols made from reactants described include poly(hexamethylene adipate), poly(1,4-butylene adipate), poly(ethylene phthalate) and poly(ethylene maleate). Another class of preferred polyester polyols includes polycaprolactone polyols made from polymerization of caprolactone, propylolactone and methylcaprolactone with various diols or higher polyols. Especially preferred are those poly(caprolactone) polyols having molecular weights in the range of about 500 to 900 and hydroxyl values of about 180 to 220.

Polyether polyols which may be used in the preparation of the isocyanate-functional polyurethanes are generally known. Useful polyether polyols are those prepared from the polymerization of aldehydes, alkylene oxides, or glycols by known methods. For example, formaldehyde, ethylene oxide, propylene oxide, epichlorohydrin and the like may addition polymerize to form polyether diols under appropriate conditions. Polyether polyols include the class comprising polyalkyleneoxide polyols such as polypropylene glycol, polyethylene glycol and polybutylene glycol. The poly-(oxypropylene) glycols can be prepared by the acid or base catalyzed addition of propylene oxide to propylene glycol or dipropylene glycol initiators and by the copolymerization of propylene oxide and ethylene oxide with initiator compounds such as trimethylolpropane, glycerol, pentaerythritol, sorbitol, sucrose and the like. The polyether polyols also include the generally known poly-(oxytetramethylene) glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of polyether polyols include the generally known reaction products of 1,2-epoxide-containing compounds with polyols such as those included in the description of simple diols, triols, and higher hydric alcohols above.

The polyisocyanate which is reacted with the above polyols to form the isocyanate-functional polyurethanes essentially can be any organic polyisocyanate. The polyisocyanate may be aromatic, aliphatic, cycloaliphatic, or heterocyclic and may be unsubstituted or substituted. Many such organic polyisocyanates are known, examples of which include: toluene-2,4-diisocyanate, toluene-2,6-diisocyanate, and mixtures thereof; diphenylmethane-4,4'-diisocyanate, diphenylmethane-2,4'-diisocyanate and mixtures thereof; o-, m- and/or p-phenylene diisocyanate; biphenyl diisocyanate; 3,3'-dimethyl-4,4'-diphenylene diisocyanate; propane-1,2-diisocyanate and propane-1,3-diisocyanate; butane-1,4-diisocyanate; hexane-1,6-diisocyanate; 2,2,4-trimethylhexane-1,6-diisocyanate; lysine methyl ester diisocyanate; bis(isocyanatoethyl) fumarate; isophorone diisocyanate; ethylene diisocyanate; dodecane-1,12-diisocyanate; cyclobutane-1,3-diisocyanate; cyclohexane-1,2-diisocyanate, cyclohexane-1,3-diisocyanate, cyclohexane-1,4-diisocyanate and mixtures thereof; methylcyclohexyl diisocyanate; hexahydrotoluene-2,4-diisocyanate; hexahydrotoluene-2,6-diisocyanate and mixtures thereof; hexahydrophenylene-1,3-diisocyanate; hexahydrophenylene-1,4-diisocyanate and mixtures thereof; perhydrodiphenylmethane-2,4'-diisocyanate, perhydrodiphenylmethane-4,4'-diisocyanate and mixtures thereof; 4,4'-methylene bis(isocyanato cyclohexane) available from Mobay Chemical Company as Desmodur W; 3,3'-dichloro-4,4'-diisocyanatobiphenyl, tris(4-isocyanatophenyl)methane; 1,5- diisocyanatonaphthalene, hydrogenated toluene diisocyanate; 1-isocyanatomethyl-5-isocyanato-1,3,3-trimethylcyclohexane and 1,3,5-tris(6-isocyanatohexyl)-biuret.

Examples of hydroxyl-functional acrylates which can be reacted with the isocyanate-functional polyurethanes to form the polyurethane acrylates include: 2-hydroxyethyl (meth)acrylate; glycerol di(meth)acrylate; the (meth)acrylates of the glycidyl ethers of butanol, bisphenol-A, butanediol, diethylene glycol, trimethylolpropane and other mono-, di-, tri- and polyhydric alcohols; the (meth)acrylates of epoxides such as styrene oxide, 1-hexane oxide, 1-decene oxide, 1-butene oxide; the (meth)acrylates of epoxidized fatty acids such as linoleic and linolenic acid; the (meth)acrylates of epoxidized linseed and soya oils; 2- and 3-hydroxypropyl (meth)acrylate, 4-hydroxybutyl (meth)acrylate; and halogenated hydroxyalkyl acrylates such as 3-chloro-2-hydroxypropyl (meth)acrylate; 3-bromo-2-hydroxypropyl (meth)acrylate; 2-chloro-1-(hydroxymethyl)ethyl (meth)acrylate, and 2-bromo-1-(hydroxymethyl)ethyl (meth)acrylate. Wherever used in the specification and claims herein, it is to be understood that the term "acrylate" is intended to include "methacrylate."

Other useful hydroxyl-functional compounds having ethylenic unsaturation which can be reacted with the isocyanate-functional polyurethanes to form ethylenically unsaturated polyurethanes include allyl alcohol and derivatives thereof.

It should be understood that the hydroxyl-functional acrylates and the polyisocyanates can be prereacted to form an isocyanate-functional acrylate which is then reacted with a polyurethane polyol to form the polyurethane acrylate. Similarly, isocyanate-functional acrylates such as isocyanato ethyl acrylate can be reacted with a polyurethane polyol to form the polyurethane acrylate. Further, other ethylenically unsaturated isocyanate-functional compounds such a vinyl isocyanate and allylisocyanate can be reacted with a polyurethane polyol to form an ethylenically unsaturated polyurethane.

Preferred acrylate-functional urethanes are amide-modified urethane acrylates as disclosed in U.S. Pat. No. 30,772, the disclosure of which is incorporated herein by reference. Such amide-modified urethane acrylates are the addition polymerizable radiation curable compounds derived from the addition reaction of three major components: an amide compound containing a hydroxyl-functional group, a polyisocyanate and a compound having at least one functional group which is reactive with an isocyanate group of the polyisocyanate compound. The described amide urethane acrylate reaction product comprises molecules having at least one each of an amide group, a urethane group and an acrylate group.

Suitable amide compounds containing at least one hydroxylfunctional group for preparing the amide urethane acrylate reaction product may be selected from such general classes of compounds as (a) a reaction product of a monocarboxylic acid and an aminoalcohol, (b) a reaction product of an ester of a carboxylic acid and an aminoalcohol, (c) a reaction product of a hydroxy carboxylic acid and a compound containing at least one primary or secondary amino nitrogen, (d) a reaction product of an inner ester of a hydroxy carboxylic acid, such as lactone, and ammonia or a compound containing at least one primary or secondary amino nitrogen, and (e) a polyamide polyol.

Suitable polyisocyanate compounds and suitable polyfunctional compounds having at least one functional group which is reactive with an isocyanate group of the polyisocyanate compound include the polyisocyanates and hydroxyl-functional acrylates previously mentioned.

In addition to the three major components required for preparing the amide urethane acrylate, the amide urethane acrylate compound can include a hydroxyl-functional compound, typically a polyol, of low to high molecular weight. The polyol component is useful for modifying the viscosity of the amide urethane acrylate compound by increasing the molecular weight of the reaction product without inhibiting its high cure rate or the physical strength properties of cured films. The polyol generally has a number of hydroxyl-functional groups sufficient to react with only a portion of the reactive isocyanate groups of the polyisocyanate to form urethane groups in the reaction product. Thus, the reaction product may contain a urethane group attached to the residue of the reaction of an amide hydroxyl compound with a polyisocyanate and the residue of the reaction of a polyol with a polyisocyanate.

Suitable classes of molecular weight building polyols having two or more hydroxyl-functional groups are polyester polyols, simple alkyl diols and triols, polyether polyols and polyoxyalkylene polyols, such as those previously mentioned.

The amide urethane acrylate compound may be generally prepared by mixing together one or more of each of the aforementioned hydroxyl group containing amide compound, polyisocyanate and polyfunctional compound and allowing the mixture to react for a period of time sufficient to form the reaction product. Or, an amide-hydroxyl compound and a polyisocyanate may be reacted to form an amide urethane intermediate having at least one terminal isocyanate group; then the intermediate is reacted with the hydroxyl acrylate compound. Or, the polyisocyanate may be reacted with the polyfunctional compound to form a urethane acrylate intermediate containing at least one terminal isocyanate group; then the intermediate is reacted with an amide-hydroxyl compound to form the reaction product. Preferably, the reaction product is formed by first preparing an amide-hydroxyl intermediate, then secondly adding the intermediate gradually to the polyisocyanate to form an NCO-terminated amide urethane, and third, adding the polyfunctional compound gradually to the amide urethane to form an amide urethane acrylate.

Whether all the components are mixed together at once or the components are added together to form intermediates, the equivalent weight ratios of amide-hydroxyl compound to polyisocyanate to polyfunctional compound are generally in the range of 1:1.25:0.25 to 1:2:1, and more usually the range of equivalent weight ratios is 1:1.5:0.65 to 1:2:1, although significantly lower amounts of the NCO-containing component may be used. An excess of the polyfunctional component is not at all harmful inasmuch as this component, especially when it is one of the aforementioned hydroxyl-acrylate compounds, constitutes a reactive diluent for the reaction product.

Where it is desired that the amide urethane acrylate compound be prepared with a molecular weight building polyol component, the polyol may be reacted with the polyisocyanate in the reaction vessel containing the amide-hydroxyl and polyisocyanate components; or the reactions may be carried out in separate vessels, and then the NCO-terminated amide urethane intermediate and the NCO-terminated polyol-residue urethane intermediate may be mixed together and further reacted with the polyfunctional compound. It is preferred that a blend of the amide hydroxyl component and the polyol component be added gradually to the polyisocyanate to form a mixture of amide urethane and polyol-residue urethane intermediates.

It is usually desired that the total hydroxyl functional group equivalent weight contributed by the amide-hydroxyl component and the polyol component be somewhat less than the equivalent weight of reactive isocyanate groups so as to provide NCO reaction sites for the polyfunctional compound.

Compounds having urea groups and ethylenic unsaturation can be prepared as reaction products of an amine containing ethylenic unsaturation and an organic mono-functional isocyanate. Suitable ethylenically unsaturated amines include allyl amine. Suitable isocyanates include methyl isocyanate, propyl isocyanate, isopropyl isocyanate, n-butyl isocyanate, cyclohexyl isocyanate and phenyl isocyanate.

Urea urethanes containing ethylenic unsaturation can be prepared as the reaction products of a diamine, a diisocyanate and a hydroxyl-functional ethylenically unsaturated compound. Suitable diamines include hexamethylene diamine and ethylene diamine. Suitable polyisocyanates and hydroxyl-functional compounds include those previously described.

The composition of the invention further includes a radiation insensitive compound having a number average molecular weight of at least about 400, preferably between about 400 and about 4,000 and, more preferably, between about 1000 and about 4,000, comprising at least about 40 percent, preferably between about 50 percent and about 60 percent and, more preferably, between about 51 and about 55 percent, by weight, based on the weight of the radiation insensitive compound, of aromatic ring moieties and having a hydroxyl equivalent weight of between about 200 and about 1500, preferably between about 250 and about 500. Suitable aromatic ring moieties include phenyl and substituted phenyls. Preferably, the hydroxyl equivalent weight of the radiation insensitive compound is due to non-aromatic hydroxyl groups. Preferably, the radiation insensitive compound is selected from the group consisting of epoxy resins, phenoxy resins and mixtures thereof. The radiation sensitive compound is preferably present in the compositions of the invention at a level of from about 15 percent to about 60 percent, by weight, more preferably from about 20 percent to about 35 percent, by weight, based on resin solids.

Examples of useful epoxy resins include the epoxy polyethers obtained by reacting an excess of a compound, such as an epihalohydrin, particularly, epichlorohydrin or epibromohydrin, glyceroldichlorohydrin, dichlorohydrin or 1,3-dichloro-2-hydroxypropane with a polyphenol in the presence of an alkali. Suitable phenols include resorcinol, catechol, hydroquinone, pyrogallol, phloroglucinol, saligenin, pyrocatechol, bis(4-hydroxyphenyl)-2,2-propane commonly known as bisphenol A, bis(4-hydroxyphenyl)-1,1-isobutane, bis(4-hydroxyphenyl)-1,1-ethane, bis(2-hydroxynaphenyl)-methane, 1,5-hydroxynaphthalene, bis(4-hydroxyphenyl-2,2-butane), bis(4-hydroxytertiary butylphenyl)-2,2-propane, bis(4-hydroxyphenyl-2,2-methane) commonly known as bisphenol F and trihydroxydiphenyl dimethyl methane.

Preferred epoxy resins are copolymers of bisphenol A and epichlorohydrin having a number average molecular weight of at least about 400, preferably between about 400 and about 4,000. The preferred epoxy resins have an epoxy equivalent weight of between about 200 and about 5000, preferably between about 400 and about 4000. These resins have a generalized formula of:

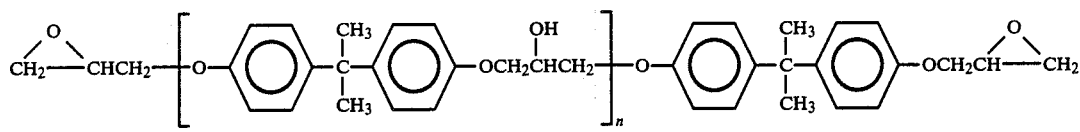

where n is an integer sufficient to provide the epoxy resins with the desired number average molecular weight. Such resins are commercially available from Shell Chemical Company as Epon ® epoxy resins.

Examples of useful phenoxy resins include copolymers obtained by reacting a compound, such as an epihalohydrin, particularly epichlorohydrin or epibromohydrin, glycerol-dichlorohydrin, dichlorohydrin or 1,3-dichloro-2-hydroxypropane, with a polyphenol in a 1:1 molar ratio in the presence of an acid.

Suitable polyphenols include those that can be used to prepare the phenoxy resins.

Preferred phenoxy resins are copolymers of bisphenol A and epichlorohydrin which are thermoplastic, linear copolymers having a number average molecular weight of at least about 2000, preferably between about 10,000 and about 40,000 and, more preferably, between about 12,000 and about 30,000. These resins include repeating units having a generalized formula of:

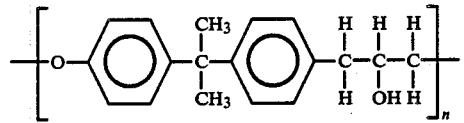

where n is an integer sufficient to provide the phenoxy resin with the desired number average molecular weight and is typically between about 82 and about 123. Such resins are commercially available from Union Carbide Corporation as UCAR ® phenoxy resins or from Shell Chemical Company as Eponol ® phenoxy resins.

The composition of the invention includes a crosslinking agent that is reactive with the hydroxyl groups present in the radiation insensitive compound. The crosslinking agent is selected from the group consisting of an aminoplast resin, a blocked isocyanate and mixtures thereof.

The aminoplast resins useful in connection with the invention include any such resin known in the art. Preferred aminoplast resins include melamine based resins, benzoguanamine-based resins and urea-formaldehyde-based resins. Suitable melamine-based resins include aldehyde condensation products of melamine. Generally, the aldehyde employed is formaldehyde. These aldehyde condensation products contain methylol or similar alkylol groups. Such amine-aldehyde resins are produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously. Hexamethoxymethyl melamine available from American Cyanamid as Cymel 303 and a benzoguanamine-based resin available from American Cyanamid as Cymel 1125 are particularly preferred. Typically, the aminoplast resin will be present in the composition at a level of between about 3 percent and about 10 percent, by weight, based on resin solids.

Suitable blocked isocyanates include reaction products of an isocyanate and a stoichiometric amount of a mono-functional compound that is reactive with isocyanate groups and is volatile at a temperature of about 300° F. and above. Examples of suitable blocked isocyanates include a methyl ethyl ketoxime blocked triisocyanate adduct of hexamethylene diisocyanate and water, an epsilon-caprolactam blocked triisocyanate adduct of hexamethylene diisocyanate and water and an adduct of trimethylolpropane and toluene diisocyanate that is blocked with 2-ethylhexanol.

Preferably, compositions of the invention further include an ethylenically unsaturated monomer which acts as a reactive diluent. Typically, the monomer will act as a solvent for the epoxy or phenoxy resin. Examples of such monomers are mono-acrylate functional compounds such as tetrahydrofurfuryl acrylate, phenyl cellosolve acrylate, isodecyl acrylate and ethoxyethoxy ethyl acrylate. Generally, the monomer will be present in the compositions at a level of from about 15 percent to about 60 percent, by weight, based on resin solids.

The composition can include other components such as pigments, fillers, solvents, thermoplastic resins, photoinitiators and the like.

Suitable pigments include those which are known to inhibit corrosion such as strontium chromate, zinc phosphate and barium metaborate. Further, conventional pigments such as titanium dioxide and zinc oxide can be included in the compositions of the invention.

Suitable fillers include clays, barytes, mica, talcs and calcium carbonate.

The processes of the invention comprise the steps of applying a composition of the invention to a substrate to form a coated substrate, partially curing the composition in a first curing step, and further curing the composition in a second curing step. One of the curing steps involves exposing the coated substrate to radiation, the other involves exposing the coated substrate to heat.

The compositions of the invention are particularly useful as primers for metal substrates, such as galvanized steel. Thus, preferred substrates include galvanized steel, aluminized steel and the like.

The composition can be applied to the substrate by any known method, such as doctor blade coating, reverse roll coating, gravure coating, gravure offset coating, wire bar coating and slit nozzle spray coating. The most suitable method is determined by factors such as the substrate, desired film thickness and required speed of application. Typically, the compositions are applied to the substrate so as to have a dry film thickness of between about 1 mil and about 3 mils, preferably about 2 mils.

The composition of the invention, after being applied to the substrate, is partially cured in a first curing step. Typically, the composition is partially cured so that it can withstand between about 30 and about 50 double rubs of a solvent such as acetone or methyl ethyl ketone and has a pencil hardness of between about 2B and about F. In the preferred embodiments, the first curing step involves the exposure of the coated substrate to either ionizing radiation, such as electron beam radiation or ultraviolet light.

Typically, if the composition is to be partially cured by exposure to ultraviolet light, a photoinitiator, such as benzoin, alpha-methyl-methylbenzoin, phenyl benzoin, benzil, diacetylbenzil, alpha-methyl-benzoyl, alpha-allylbenzoyl, benzoin methyl ether, benzoin ethyl ether, benzoin isopropyl ether, benzoin-butyl ether, benzoin phenyl ether, acetophenone, benzophenone, para-bromobenzophenone, 4,4'-tetramethyl-diaminobenzophenone, diphenyl disulfide, dibenzyl disulfide, tetraethylthiuram disulfide, decylallyl sulfide, decyl thiobenzoate, benzylacetyl, uranyl nitrate, eosine, thionine, 2,3-pentanedione, 2,3-octanedione, 1-phenyl-1,2-butanedione, 2,2-dimethyl-4-phenyl-3,4-butanedione, phenyl-glyoxal, diphenyl-triketone, dinaphthyl ketone, xanthane, anthraquinone, alpha-chloroacetyldiphenyloxide, and Michler's ketone is included in the composition. Furthermore, any of such aromatic nitro compounds as trinitroaniline, nitronaphthalene, 5-nitroacenaphthene, 2-nitrofluorene and picramide, such quinones as naphthoquinone, and 2,3-diphenylanthraquinone, anthrone and pyrylium salt, can be used together with the photoinitiator to enhance the effect of the photoinitiator. The composition of the invention will partially cure to an acceptable state using between about 5 and 20 feet per minute per 200 watt per inch medium pressure mercury lamp spaced four inches above the substrate, most preferably about 5 feet per minute per lamp.

If the composition of the invention is to be partially cured using electron beam radiation, the composition will generally partially cure acceptably using any total dosage between about 2.5 megarad and about 20 megarads. A "rad" is defined as that amount of radiation required to supply 100 ergs per gram of material being treated and a "megarad" is $10^6$ rads. The total dosage is the total amount of irradiation received by the coating. The preferable total dosage used is from about 5 megarads to about 10 megarads, most preferably about 5 megarads.

The coated, partially cured substrate is then further cured in a second curing step. If the coated, partially cured substrate has been partially cured using either ionizing radiation or ultraviolet light, the coated, partially cured substrate is further cured by heat. If the coated, partially cured substrate has been partially cured by heat, it is further cured using either ionizing radiation or ultraviolet light.

Preferably, the coated, partially cured substrate is coated with a thermally curable durable topcoat prior to being further cured in the second curing step. Suitable thermally curable topcoats include a polyvinylidiene fluoride-based coating available from PPG Industries, Inc. under tha trademark Duranar ®, acrylic-based coatings available from PPG Industries, Inc. under the trademark Duracron ® and polyester-based coatings available from PPG Industries, Inc. under the trademark Polycron ®. After the topcoat is applied, the substrate is then subjected to the second curing step to further cure the primer and to cure the topcoat. Typically, the coated substrate is exposed to infrared radiation at an oven temperature of between about 600° F. (315° C.) and about 650° F. (343° C.) panel temperature of about 435° F. (224° C.) and about 465° F. (241° C.) for between about 40 seconds and about 50 seconds.

However, it should be understood that if a radiation-curable topcoat were used, the composition of the invention could be first partially cured by exposing the coated substrate to heat, the topcoat could be applied, and then, the primer could be further cured and the topcoat could be cured by exposing the coated substrate to either ultraviolet light or ionizing radiation.

The following Examples sets forth specific embodiments of the instant invention, however the invention is not to be construed as being limited to these embodiments for there are, of course, numerous possible variations and modifications. All parts and percentages in the Examples as well as throughout the specification are by weight unless otherwise indicated.

EXAMPLES

EXPLANATION OF THE TESTING PROCEDURES

Solvent Resistance

Films were tested for solvent resistance by rubbing a soft cloth soaked in solvent, typically either acetone or methylethyl ketone, back and forth across the surface of the film. The number of double rubs (forward and backward strokes) necessary to dissolve the film is noted.

Cross Hatch Adhesion

The film of a cured coated panel is scribed with a crosshatch pattern using a Gardner cross hatch adhesion tester. A piece of Scotch ® 610 tape available from the 3M Company is then placed firmly in contact with the film over the cross hatch and immediately removed therefrom. The percentage of the film remaining on the panel as the tape is released is noted.

Pencil Hardness

Pencils of different hardnesses are pushed across the film with the point of each pencil being at about a 45° angle with respect to the film. The hardness of the lead of the hardest pencil that does not tear the film is noted.

T-Bend

The lower ½ inch wide edge of a coated cured panel is bent back 180° underneath the panel so that the uncoated portion of the panel and the uncoated portion of the bent edge are in contact with each other. The process is repeated, each time the number of thicknesses of the panel that are sandwiched between the bend increases by one, until the particular test at issue is passed. The minimum number of thicknesses of the panel that are sandwiched between the bend where the film passes the test is noted. The flexibility of the film is noted as pass if the film does not crack at the bend. The adhesion of the film to the panel is rated as pass if a piece of Scotch ® 610 tape pressed firmly in contact with the film at the bend, and immediately removed therefrom, does not remove any of the film from the panel.

Reverse Impact

The short edges of a coated cured panel are held between the jaws of a Gardner impact tester available from Gardner Labs so that the uncoated side is facing up. A two pound weight is dropped onto the uncoated side of the panel from various heights. The coating passes the flexibility test if the coating on the reverse side of the panel at the point of impact does not crack. The coating passes the adhesion test if a piece of Scotch ® 610 tape, placed on the panel after the impact and immediately removed therefrom, does not remove any of the coating from the panel. The impact at which the coating passes each test is noted in units of inch-pounds.

PREPARATION OF THE URETHANE ACRYLATES

The following generalized procedure can be used in the preparation of the urethane acrylates A, B and C which are used in the compositions of the Examples. First, the diisocyanate, the reactive diluent, such as isodecyl methacrylate, phenyl cellosolve acrylate, isodecyl acrylate, 2-ethylhexyl acrylate and tetrahydrofurfuryl acrylate and catalyst, such as dibutyltin dilaurate, are charged to a reaction vessel. Next, the polyol is added to the reaction vessel at such a rate so as to maintain the charge at a temperature of approximately 40° C. Thereafter, the charge is heated to approximately 50° C. and is held at that temperature for about 2 hours. Next, the charge is heated to approximately 60° C. and is held at that temperature for approximately one hour. Thereafter, an oxidation inhibitor such as 2,6-di-t-butyl-p-cresol, available from Shell Chemical Company under the trademark Ionol ®, is added to the charge. Next, hydroxyethyl acrylate is added to the charge at such a rate so as to maintain the temperature of the charge at approximately 60° C.–65° C. Thereafter, the charge is heated to a temperature of approximately 70° C.–75° C. and is held within that temperature range until an infrared spectrum analysis of the charge indicates that substantially all of the isocyanate has reacted. This last step can be interrupted by allowing the charge to cool to ambient temperature overnight, then heating the charge to a temperature of approximately 70° C.–75° C. and holding the charge in that temperature range until the reaction is substantially complete.

EXAMPLE 1

A urethane acrylate was prepared from the following components:

| Component | Parts, by weight |
| --- | --- |
| 4,4'-methylenebis(isocyanato cyclohexane)[1] | 164.5 |
| dibutyltin dilaurate | 0.6 |
| isodecylmethacrylate | 63.2 |
| phenyl cellosolve acrylate | 63.2 |
| polybutylene oxide[2] | 96.7 |
| amide diol[3] | 9.1 |
| hydroxyethyl acrylate | 105.1 |
| 2,6-di-t-butyl-p-cresol[4] | 9.6 |

[1]Available from Mobay Chemical Co. as Desmodur W.
[2]Available from E. I. Dupont deNemours & Co., Inc. as Terecol 650.
[3]Reaction product of N—methylethanol amine and butyrolactone in a 1:1 molar ratio.
[4]Available from Shell Chemical Co. under the trademark Ionol ®.

The resulting resin has a solids content of 71.8 percent, a Gardner-Holdt bubble tube viscosity at ambient temperature of Z4, a color value of 1, a weight/gallon of 8.98, an acid value of 1.36 and a hydroxyl value of 14.7.

EXAMPLE 2

A urethane acrylate was prepared from the following components:

| Component | Parts, by weight |
| --- | --- |
| 4,4'-methylene bis(isocyanato cyclohexane)[1] | 1064 |
| amide diol[1] | 176 |
| polybutylene oxide[1] | 650 |
| 2-ethylhexyl acrylate | 784 |
| tetrahydrofurfuryl acrylate | 494 |
| 2,6-di-t-butyl-p-cresol[1] | 4.6 |
| hydroxyethyl acrylate | 464 |

[1] As in the urethane acrylate of Example 1.

EXAMPLE 3

A urethane acrylate was prepared form the following components:

| Component | Parts, by weight |
| --- | --- |
| 4,4'-methylene bis(isocyanato cyclohexane)[1] | 1064 |
| amide diol[1] | 176 |
| polybutylene oxide[1] | 650 |
| hydroxyethyl acrylate | 464 |
| isodecyl acrylate | 415 |
| 2,6-di-t-butyl-p-cresol[1] | 4.6 |

[1] As in the urethane acrylate of Example 1.

PREPARATION OF THE COMPOSITIONS OF THE INVENTION

EXAMPLE 4

A primer composition was formed from the following components:

| Component | Parts by weight |
| --- | --- |
| epoxy resin[1] | 118.5 |
| urethane acrylate of Example 1 | 22.5 |
| benzoguanamine resin[2] | 9.0 |
| 10% solution of paratoluene sulfonic acid in ethanol | 0.6 |
| strontium chromate | 13.0 |
| titanium dioxide[3] | 2.6 |
| clay[4] | 4.2 |
| phenyl cellosolve acrylate | 19.0 |
| dibutyltin dilaurate | 1.0 |

[1] A blend of 40 percent, by weight of an epoxy resin available from Shell Chemical Co. as Epon ® 1007 and 60 percent, by weight, of phenyl cellosolve acrylate.
[2] Available from American Cyanamid as Cymel 1125.
[3] Available from E. I. DuPont de Nemours & Co. as TiPure ® R-902.
[4] Available from Englehard as ASP 400.

After the above components were mixed, the pigments were ground to a grind of 7 on a Hegman scale.

The above primer composition was drawn down on a 1303 HDG steel panel available from E. G. Smith Company using a 0.032 wire drawbar. Next, the panel was partially cured in nitrogen using 5 megarads of electron beam radiation from a 300 kilovolt electron beam to a dry film thickness of 2 mils. A topcoat[5] was drawn down on the partially cured primed substrate using an 0.040 wire drawbar and the panel was baked for 50 seconds at a temperature so that the temperature of the panel reached 465° F. The resulting cured film had good salt spray and humidity resistance. In addition, the resulting cured film had good flexibility and adhesion to the substrate as shown in Table 1.

[5] Fluorocarbon based coating available from PPG Industries, Inc. under the trademark Duranar ®.

TABLE 1

| | |
| --- | --- |
| acetone resistance | >100 |
| pencil hardness | HB |
| reverse impact flexibility (inch-pounds) | 160 |
| reverse impact adhesion (percent) | 100 |
| T-bend flexibility | 2 |
| T-bend adhesion | 1 |
| cross hatch adhesion (percentage) | 95 |

EXAMPLE 5

Primer compositions were formed from the following components:

| Composition Component | 5A | 5B | 5C |
| --- | --- | --- | --- |
| | Parts by weight | | |
| epoxy resin[1] | 118.5 | 118.5 | 97.0 |
| urethane acrylate of Example 1 | 22.5 | | |
| urethane acrylate of Example 2 | | 26.5 | 26.5 |
| blocked isocyanate[2] | | | 26.5 |
| melamine resin[3] | 9.0 | 9.0 | |
| dibutyltin dilaurate | | | 1.5 |
| 10% solution of paratoluene sulfonic acid in ethanol | 0.6 | 0.6 | |
| strontium chromate | 13.0 | 13.0 | 13.0 |
| titanium dioxide[1] | 2.6 | 2.6 | 2.6 |
| clay[1] | 4.2 | 4.2 | 4.2 |
| xylene | 9.8 | 9.8 | 9.9 |

[1] As in Example 4.
[2] 68.6 percent, by weight, of a methyl ethyl ketoxime blocked triisocyanate adduct of hexamethylene diisocyanate and water that is 68.12 percent, by weight, of a triisocyanate adduct of hexamethylene diisocyanate available as Desmodur N from Mobay Chemical Co. and 31.88 percent, by weight, of methyl ethyl ketoxime and 31.4 percent, by weight, of solvents that are 26.46 percent, by weight, of xylene and 73.54 percent, by weight, of cellosolve acetate.
[3] Hexamethoxymethylmelamine available from American Cyanamid as Cymel 303.

After the above components were mixed, the pigments were ground to a grind of 7 on a Hegman scale.

The above primer compositions, including 2 percent, by weight, of benzophenone and 2 percent, by weight, of 2,2-di-methoxy-2-phenoxyacetophenone available from Ciba-Geigy Corporation as Irgacure 651 were drawn down on separate 1303 HDG steel panels using a 0.026 wire drawbar. Next, the panels were partially cured in air using four 200 watt per inch medium pressure mercury lamps suspended four inches above the panels to a dry film thickness of 2 mils. The panels passed under the lamps at a speed of twenty feet per minute.

The topcoat of Example 4 was drawn down on the partially cured primed substrate using an 0.040 wire drawbar and the panels were baked for 45 seconds at an oven temperature of 570° F. The resulting cured films had good salt spray resistance and humidity resistance. In addition, the resulting cured films had good flexibility and adhesion to the substrate as shown in Table 2.

TABLE 2

| Composition of primer | 5A | 5B | 5C |
| --- | --- | --- | --- |
| pencil hardness | F | F | F |
| acetone resistance | >100 | >100 | >100 |
| T-bend flexibility | 2 | 4 | 4 |
| T-bend adhesion | 1 | 2 | 2 |
| reverse impact flexibility (inch-lbs.) | 120 | 120 | 120 |
| crosshatch adhesion (percent) | 100 | 100 | 100 |

Panels of coatings of primer compositions 5B and topcoat and 5C and topcoat were prepared as set forth above and evaluated according to the Kesternich test for resistance to pollution, such as acid rain. The panels were placed in an enclosed chamber and subjected to continuous cycles of 8 hours in 100% humidity, carbon dioxide and sulfur dioxide at 100° F. followed by 16 hours at ambient conditions. After 27 cycles, the panel having the coating of composition 5B had a few very small blisters. After 51 cycles, the panel having a coating of composition 5C did not show any signs of blistering.

EXAMPLE 6

A panel having a primer of composition 5C without photoinitiators was prepared as in Example 5 with the exception that the primer composition was partially cured in a nitrogen atmosphere using 5 megarads of electron beam radiation from a 300 kilovolt electron beam instead of being partially cured using ultraviolet radiation before being coated with the topcoat. The resulting cured film had good salt spray resistance and humidity resistance. In addition, the resulting cured film had good flexibility and adhesion to the substrate as shown in Table 3.

TABLE 3

| | |
|---|---|
| pencil hardness | HB |
| acetone resistance | >100 |
| T-bend flexibility | 3 |
| T-bend adhesion | 3 |
| reverse impact flexibility (inch-lbs.) | 120 |
| reverse impact adhesion (inch-lbs.) | 100 |
| crosshatch adhesion (percent) | 100 |

EXAMPLE 7

Primer compositions were formed from the following components

| Composition Component | 7A | 7B |
|---|---|---|
| | Parts by weight | |
| epoxy resin[1] | 97.0 | 97.0 |
| urethane acrylate of Example 3 | 45.0 | 26.5 |
| blocked isocyanate[2] | | 26.5 |
| melamine resin[2] | 8.0 | |
| dibutyltin dilaurate | | 1.5 |
| 10% solution of paratoluene sulfonic acid in ethanol | 0.5 | |
| strontium chromate | 13.0 | 13.0 |
| titanium dioxide[1] | 2.6 | 2.6 |
| clay[1] | 4.2 | 4.2 |
| xylene | 9.8 | 9.8 |

[1]As in Example 4.
[2]As in Example 5.

After the above components were mixed, the components were ground to a grind of 7 on a Hegman scale.

Samples of the above primer compositions, including 2 percent, by weight, of benzophenone and 2 percent, by weight of 2,2-dime-thoxy-2-phenylacetophenone available from Ciba-Geigy Corporation as Irgacure 651, were drawn down on separate 1303 HDG steel panels using a 0.026 wire drawbar. Next, the panels were partially cured in air using four 200 watt per inch medium pressure mercury lamps suspended four inches above the panels to a dry film thickness of 2 mils. The panels passed under the lamps at a speed of twenty feet per minute.

The topcoat of Example 4 was drawn down on the partially cured primed substrates using an 0.040 wire drawbar prior to being baked for 45 seconds at an oven temperature of 570°. The resulting cured films had good salt spray resistance and humidity resistance. In addition, the resulting cured films had good flexibility and adhesion to the substrates as shown in Table 4.

TABLE 4

| Composition of primer | 7A | 7B |
|---|---|---|
| pencil hardness | HB | F |
| acetone resistance | >100 | >100 |
| T-bend flexibility | 4 | 4 |
| T-bend adhesion | 2 | 2 |
| reverse impact flexibility (inch-lbs.) | 100 | 120 |
| reverse impact adhesion (inch-lbs.) | 120 | 120 |
| crosshatch adhesion (percent) | 100 | 100 |

Panels of coatings of primer compositions 7A and topcoat and 7B and topcoat were prepared as set forth above and evaluated according to the Kesternich test for resistance to pollution, such as acid rain. The panels were placed in an enclosed chamber and subjected to continuous cycles of 8 hours in 100% humidity, carbon dioxide and sulfur dioxide at 100° F. followed by 16 hours at ambient conditions. After 51 cycles, the panels did not show any signs of blistering.

EXAMPLE 8

Panels were prepared as in Example 7 without photoinitiators with the exception that the primer compositions were partially cured in a nitrogen atmosphere using 5 megarads of electron beam radiation from a 300 kilovolt electron beam instead of being partially cured using ultraviolet radiation before being coated with the topcoat. The resulting cured films had good salt spray resistance and acetone resistance. In addition, the resulting cured films had good flexibility and adhesion to the substrates as shown in Table 5.

TABLE 5

| Composition of primer | 7A | 7B |
|---|---|---|
| pencil hardness | B | HB |
| acetone resistance | >100 | >100 |
| T-bend flexibility | 4 | 4 |
| T-bend adhesion | 4 | 2 |
| reverse impact flexibility (inch-lbs.) | 40 | 120 |
| reverse impact adhesion (inch-lbs.) | 50 | 100 |
| crosshatch adhesion (percent) | 40 | 100 |

EXAMPLE 9

Primer compositions were formed from the following components:

| Composition Component | 9A | 9B |
|---|---|---|
| | Parts by weight | |
| epoxy resin[1] | 132.0 | 132.0 |
| urethane acrylate of Example 2 | 20.0 | 25.0 |
| melamine resin[2] | 15.0 | 10.0 |
| strontium chromate | 15.4 | 15.4 |
| titanium dioxide[1] | 3.1 | 3.1 |
| clay[1] | 5.0 | 5.0 |
| 10% solution of paratoluene sulfonic acid in ethanol | 1.0 | 0.7 |
| xylene | 11.0 | 11.0 |

[1]As in Example 4.
[2]As in Example 5.

The above components were mixed together and the pigments were ground to a grind of 7 on a Hegman scale.

Thereafter, to 50 parts, by weight, of compositions 9A and 9B were added 1 part, by weight of benzophenone and 1 part, by weight, of 2,2-dimethoxy-2- phenylacetophenone available from Ciba-Geigy Corp. as Irgacure 651.

Samples of the above primer composition were drawndown on separate 1303 HDG steel panels using an 0.022 wire drawbar. Thereafter, the coated panels were partially cured to a dry film thickness of 1.0 mil in air using four 200 watt per inch medium pressure mercury lamps suspended four inches above the panels with the panels passing under the lamps at a speed of twenty feet per minute.

Panels were prepared as with various film thicknesses of the primer. In addition, after the primed substrate had been partially cured by exposure to radiation, the topcoat of Example 4 was drawn down on the partially cured primed substrate using an 0.040 wire drawbar. Thereafter, the panels were baked for 50 seconds at an oven temperature of 570° F. The resulting cured films had good salt spray resistance and humidity resistance. In addition, the resulting cured films had good flexibility and adhesion to the substrates as shown in Table 6.

TABLE 6

| composition of primer | 9A | 9B |
| --- | --- | --- |
| pencil hardness | H | H |
| methylethylketone resistance | >100 | >100 |
| T-bend flexibility | 5 | 5 |
| T-bend adhesion | 3 | 3 |
| reverse impact flexibility (inch-lbs.) | 20 | 60 |
| reverse impact adhesion (inch-lbs.) | 80 | 80 |
| crosshatch adhesion (percentage) | 100 | 100 |

EXAMPLE 10

A primer composition was formed from the following components:

| Component | Parts by weight |
| --- | --- |
| strontium chromate | 15.62 |
| titanium dioxide[1] | 3.12 |
| phenoxy resin[2] | 106.58 |
| dipropylenephthalate diacrylate | 35.42 |
| urethane acrylate of Example 2 | 21.00 |
| melamine resin[3] | 10.00 |
| xylene | 25.60 |
| methylethyl ketone | 10.00 |
| 10% solution of paratoluene sulfonic acid in ethanol | 1.00 |

[1] As in Example 4.
[2] A blend of 40 percent, by weight, of a phenoxy resin available from Union Carbide as PKHH and having a viscosity (40% total solids in methylethyl ketone) of from 4500 to 7000 centipoise, a number average molecular weight of 16,679, weight average molecular weight of 66,752 and a peak molecular weight of 51,726 and 60 percent, by weight, of phenyl cellosolve acrylate.
[3] As in Example 5.

The above components were mixed together in a one pint stainless steel breaker with zircoa beads and stirred with a stainless steel disc impeller until the mixture had a Hegman grind of 7. Thereafter, the zircoa beads were filtered from the mixture. Next, a mixture of 10 grams of hexamethoxymethyl melamine and 1 gram of a 10 percent solution of paratoluene sulfonic acid in ethanol was added to the above composition. Thereafter, a mixture of 2.0 grams of benzophenone and 2.0 grams of 2,2-dimethoxy-2-phenylacetophenone available from Ciba-Geigy Corp. as Irgacure 651 were added to 100 grams of the composition, which was used on panels to be cured using ultraviolet radiation.

Samples of the above primer composition were drawndown on separate 1303 HDG steel panels using an 0.022 wire drawbar. Thereafter, the coated panels were partially cured to a dry film thickness of 1.0 mil either in a nitrogen atmosphere using 5 megarads of electron beam radiation from a 300 kilovolt electron beam or in air using four 200 watt per inch medium pressure mercury lamps suspended four inches above the panel with the panel passing under the lamps at a speed of twenty feet per minute.

A topcoat of Example 4 was drawndown on the partially cured primed substrates using an 0.040 wire drawbar. Next, the panels were baked for 45 seconds at a temperature such that the temperature of the panels reached 465° F. The resulting cured films had good salt spray and humidity resistance. In addition, the resulting cured films had good flexibility and adhesion to the substrates as shown in Table 7.

TABLE 7

| type of cure | UV | 5 Mrads EB |
| --- | --- | --- |
| pencil hardness | F | HB |
| methylethylketone resistance | >100 | >100 |
| T-bend flexibility | 3 | 2 |
| T-bend adhesion | 3 | 2 |
| reverse impact flexibility (inch-lbs.) | 60+ | 120 |
| reverse impact adhesion (inch-lbs.) | 120 | 120 |
| cross hatch adhesion (percent) | 100 | 100 |

EXAMPLE 11

The primer composition of Example 4 was drawn down on a 1303 HDG steel panel using a 0.032 drawbar and was partially cured by being baked for 10 minutes at an oven temperature of 280° F. to a dry film thickness of 2 mils. Next, a topcoat[1] was drawn down on the partially cured substrate using a 0.014 draw bar and was cured using 5 megarads of electron beam radiation from a 300 kilovolt electron beam to a dry film thickness of 1 mil. The primer had good adhesion to both the substrate and the topcoat.

[1] The topcoat had a composition of 10.47 parts, by weight, of a thermoplastic acrylic resin available from Rohm & Haas as Acryloid® DM-54, 10.47 parts, by weight, of hexanediol diacrylate, 6.47 parts, by weight, tripropyleneglycol diacrylate, 6.47 parts, by weight, of a pentaerythritol tri-and tetraacrylate blend, 0.5 parts, by weight, of a flow control agent available as Modaflow® from Monsanto, 55 parts, by weight, titanium dioxide, 8.73 parts, by weight of a blue tint and 1.89 parts, by weight of a black tint.

We claim:
1. A composition comprising:
   (a) a radiation sensitive compound having ethylenic unsaturation and at least one moiety selected from the group consisting of a urea moiety, a urethane moiety and mixtures thereof;
   (b) a radiation insensitive compound having a number average molecular weight of at least about 400, comprising at least about 40 percent, by weight, based on the weight of said radiation insensitive compound, of aromatic ring moieties and having a hydroxyl group equivalent weight of between about 200 and about 1500; and
   (c) a crosslinking agent reactive with the hydroxyl groups present in said radiation insensitive compound, said crosslinking agent being selected from the group consisting of an aminoplast resin, a blocked isocyanate and mixtures thereof, such that said composition is capable of being cured using heat and either ultraviolet light or ionizing radiation.

2. The composition of claim 1 wherein said radiation sensitive compound comprises a urethane moiety.

3. The composition of claim 1 wherein said radiation sensitive compound comprises acrylate functionality.

4. The composition of claim 2 wherein said radiation sensitive compound is a urethane acrylate.

5. The composition of claim 4 wherein said urethane acrylate is a diacrylate.

6. The composition of claim 1 wherein said radiation insensitive compound is an epoxy resin.

7. The composition of claim 1 wherein said crosslinking agent is an aminoplast resin selected from the group consisting of a melamine resin, a benzoguanamine resin and mixtures thereof.

8. The composition of claim 1 wherein said radiation sensitive compound is present at a level of from about 5 percent to about 50 percent, by weight, based on resin solids.

9. The composition of claim 1 wherein said radiation insensitive compound is present at a level of from about 15 percent to about 60 percent, by weight, based on resin solid.

10. The composition of claim 1 wherein said aminoplast resin is present at a level of from about 3 percent to about 10 percent, by weight, based on resin solids.

11. The composition of claim 1 further comprising a reactive diluent.

12. A process comprising the steps of:
    (a) applying to a substrate a composition comprising
        (i) a radiation sensitive compound having ethylenic unsaturation and at least one moiety selected from the group consisting of a urea moiety, a urethane moiety and mixtures thereof,
        (ii) a radiation insensitive compound having a number average molecular weight of at least about 400, comprising at least about 40 percent, by weight, based on the weight of said radiation insensitive compound, of aromatic ring moieties and having a hydroxyl group equivalent weight of between about 200 and 1500, and
        (iii) a crosslinking agent reactive with the hydroxyl groups present in said radiation insensitive compound, said crosslinking agent being selected from the group consisting of an aminoplast resin, a blocked isocyanate and mixtures thereof, such that said composition is capable of being cured using heat and either ionizing radiation or ultraviolet light.
    (b) partially curing said composition in a first curing step; and
    (c) further curing said composition in a second curing step;
wherein one of said curing steps comprises exposing said coated substrate to either ultraviolet light or ionizing radiation and the other curing step comprises exposing said coated substrate to heat.

13. The process of claim 12 further comprising the step of applying a topcoat to said coated substrate between said first and second curing steps.

14. The process of claim 12 wherein said first curing step involves exposing said coated substrate to either ultraviolet light or ionizing radiation.

15. The process of claim 13 wherein said topcoat is thermally curable, said first curing step involves exposing said coated substrate to either ultraviolet light or ionizing radiation and said second step involves exposing said coated substrate to heat.

16. The process of claim 12 wherein said composition is applied to said substrate so that it is cured to a dry film thickness of from about 1 mil to about 3 mils.

17. The process of claim 12 wherein said substrate is metal.

* * * * *